Patented Sept. 27, 1927.

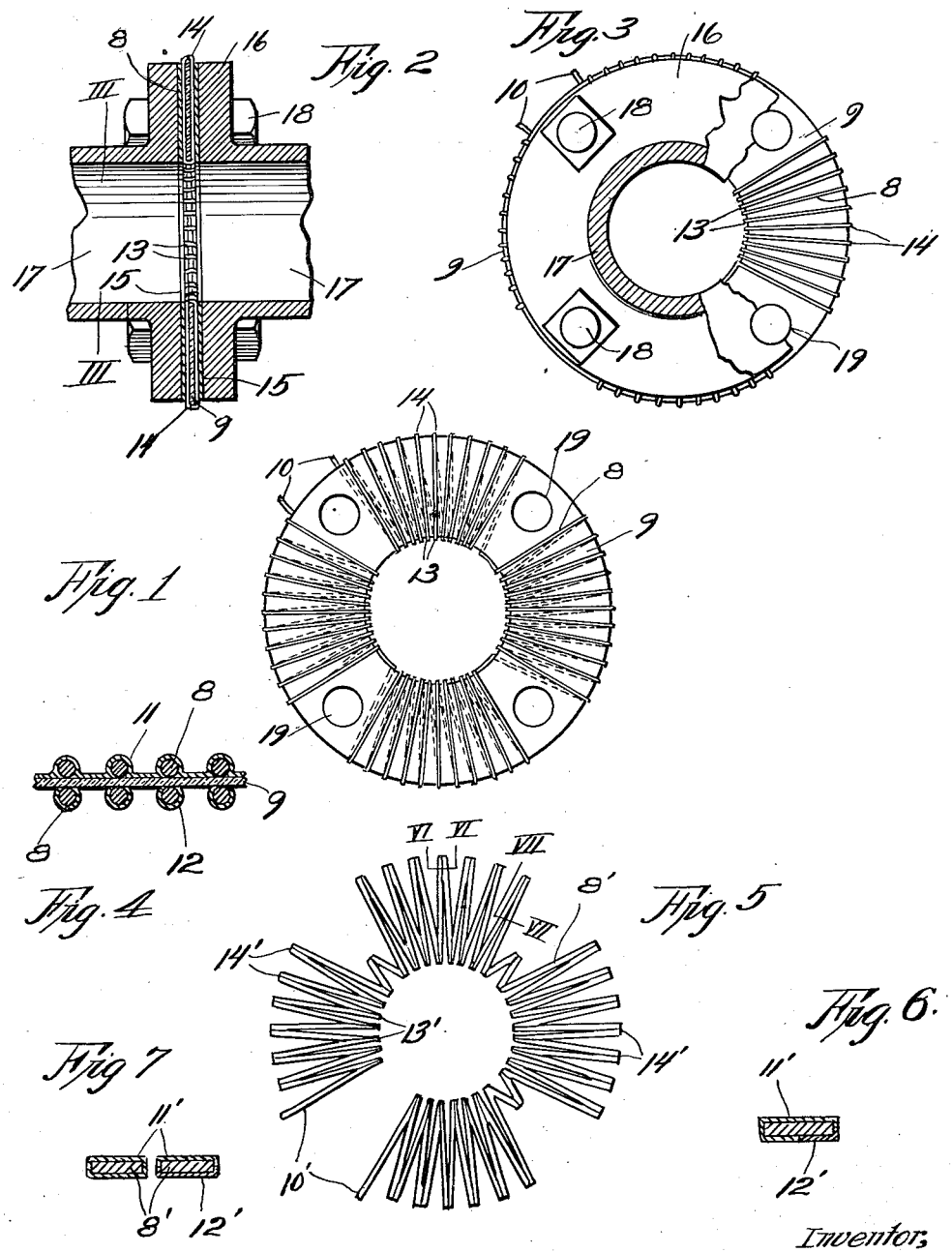

1,643,734

UNITED STATES PATENT OFFICE.

VLADIMIR K. ZWORYKIN, OF KANSAS CITY, MISSOURI, ASSIGNOR TO C & C DEVELOPING COMPANY, OF KANSAS CITY, MISSOURI. A CORPORATION OF ARIZONA.

THERMOCOUPLE.

Application filed June 19, 1922. Serial No. 569,501.

The present invention relates to electrical apparatus, and aims to provide a new and improved thermocouple structure as well as a novel and efficient method or process of constructing the same.

Accordingly, I have devised an improved form of thermocouple element which comprises an electrical conductor having one of its portions (that is, a portion at one side of the thermocouple joint) provided with an application of metal of a different element from that of the conductor.

It is also sought to provide a thermocouple structure of this character which will permit of the construction of any desired number of identical thermocouple elements in series, by the application of the necessary metallic coating to alternating portions of the conductor simultaneously.

In carrying out the invention in practice, the method which I have devised for constructing the improved thermocouple element, either singly or in multiple, consists in applying a protective coating to a portion or alternating portions of the conductor, and then subjecting the unprotected portions of the conductor to any well known form of plating means whereby said unprotected portions of the conductor will be coated with the desired metal which will cooperate with the metal of the conductor in forming the thermocouple joints.

With the foregoing general objects in view, the invention will now be described by reference to the accompanying drawing illustrating certain forms of construction which I have devised for embodying the proposed improvements, after which the novel features therein will be particularly set forth and claimed.

Figure 1 is a face view of a thermocouple structure adapted for the embodiment of the present invention;

Figure 2 is a sectional view illustrating the same form of thermocouple structure in operative relation to a joint between two pipe sections;

Figure 3 is a sectional view, partly broken away, representing a section taken on the line III—III of Figure 2;

Figure 4 is a sectional detail view showing a fragment of the thermocouple structure of the form shown in Figures 1 to 3;

Figure 5 is a face view of a blank used in the construction of a modified form of the invention; and Figures 6 and 7 are enlarged detail sections taken on the lines VI—VI and VII—VII, respectively, of Figure 5, and showing the structure of the thermocouple after the application of the protective and metallic coatings in accordance with the improved process.

Referring now to the drawing in detail, and more particularly to Figures 1 to 4, these views illustrate the improved thermocouple structure as embodied in a coil of suitable conducting material 8 wound upon an annular gasket 9 of any appropriate insulating material, such as asbestos, the ends of the conductor 8 being extended to form terminals 10 for making connection with a suitable electrical instrument as hereinafter referred to. For completing the thermocouple structure, I apply a protective covering to all of the turns of the conductor 8 at one side of the gasket 9, as by painting over this side of the gasket and the portions of the conductor traversing the same with a layer of paraffin 11, as shown clearly in Figure 4. The gasket 9 with its conductor 8 may then be subjected to an electroplating treatment, as by dipping the gasket into a suitable electroplating bath in a well known manner, for coating the turns of the conductor 8 on the other side of the gasket with a film of appropriate metal, as indicated at 12 in Figure 4, whereby the required thermocouple joints 13 and 14 are formed at the inner and outer edges, respectively, of the gasket 9; that is to say, these are joints made by the junctures between two different metals, as represented by the different metals composing the conductor 8 and the film of metal 12. These metals may of course be any desired metallic elements, having thermoelectric properties, the only limitation being that the metal selected for forming the film 12 shall be of relatively smaller electrical resistance than the metal composing the conductor 8. Any other known electrical or chemical method may be employed for coating this film of metal 12 upon the alternate portions of the conductor 8, the electroplating method described being herein set forth as presenting the method probably lending itself best for this purpose. The insulator element to which the conductor 8 is applied may also be of any desired shape or outline, according to the use to which the thermocouple structure is to be applied, the annular gasket illustrated being that particularly adapted for use in the manner illustrated in Figures 2 and 3, where the device is shown as interposed between a pair of insulating gaskets 15, and these in turn clamped between the flanges 16 at the joint between two pipe sections 17 which are coupled by means of bolts 18 passing through said flanges and through openings 19 provided in the gasket 9. If now, the terminals 10 of the conductor 8 be connected with an ordinary form of millivoltmeter (not shown), the difference in temperature between the inside and outside of the conduit formed by the pipe 17 may be measured with great accuracy, since it is apparent that the difference in potential between the ends of the multiple thermocouple structure will correspond directly to the difference between the temperature existing at the interior thermocouple joints 13 and that of the exterior thermocouple joints 14. I have found that by the use of a conductor 8 of nickle alloy composition known commercially as Advance wire, and coating the alternating turns of the coil with a silver plating, and with a sufficient number of the thermocouple joints 13 and 14, approximately as shown by Figure 1, the measuring instrument connected with the terminals 10 will register several millivolts for each degree of difference in temperature between the inside and outside of the pipe 17. If the two metals be so chosen as to produce a still greater ratio of resistance at the joints, and the number of turns of the conductor 8 increased still further, which may be done without complicating the method of process, the electromotive force may be proportionately increased for the same difference in temperature between the joints 13 and 14.

In Figures 5 to 7 I illustrate a modified and even simpler form of construction, which may be produced very cheaply and will serve equally as efficiently where a structure of this type can be used. Instead of coiling the conductor about an insulator, a zigzag coil of the desired form, as indicated at 8', is stamped from the chosen metal; then each half turn of the conductor is coated with the film 12' of a suitable different metal corresponding to the film 12 of the first form of construction, as by first applying a protective coating 11' to half of each turn of the coil and then subjecting the entire coil to the electroplating process, as before, for coating the remaining half turns with the other metal 12'. This results in the formation of the inner and outer thermocouple joints, 13' and 14', respectively. The ends of the coil are provided with the projecting teminals 10', so that the completed structure is adapted to function in all respects the same as the construction first described.

It will thus be apparent that I have devised an extremely practical, simple and efficient thermocouple structure as well as a very economical method of making the same, this process being adapted for producing the thermocouple structure in practically any form in which it may be required for use. One of the particular points of advantage is seen in the fact that the ordinary millivoltmeter may be used for ascertaining the temperatures instead of a potentiometer or other special apparatus, and in the form of thermocouple structure illustrated for ascertaining the temperatures inside a conduit or vessel, the mode of installation is vastly simplified as compared to methods heretofore used, since the present method requires only the replacing of the gasket with the thermocouple gasket and the connection of its terminals to the measuring instrument, instead of requiring any special boring or other alteration of the apparatus to which the thermocouple structure is applied. Ordinary copper wire is used for making the connection between the terminals of the thermocouple structure and the instrument used for determining the temperature, and this instrument may be placed at any point remote from the thermocouple structure without requiring any compensation on that account. Again the use of the improved thermocouple construction permits the use of temperature controlling relays without necessitating any magnification of the current or any wiring of auxiliary apparatus.

While I have illustrated and described what I now regard as practical and efficient modes of practicing the invention, I desire to reserve the right to make all such changes or modifications as may fairly and properly fall within the scope of the appended claim.

What I claim is:

A thermocouple structure comprising a continuous strip of conducting material arranged in the form of a zigzag coil and in a substantially annular outline, alternating semiconvolutions of said coil being provided with applications of metal of different resistance properties from said conducting material.

In witness whereof I hereunto affix my signature.

VLADIMIR K. ZWORYKIN.